March 7, 1961  H. B. STERNBERG  2,973,596
VEHICLE IDENTIFICATION SYSTEM
Filed July 17, 1958  2 Sheets-Sheet 1
FIG. 1.
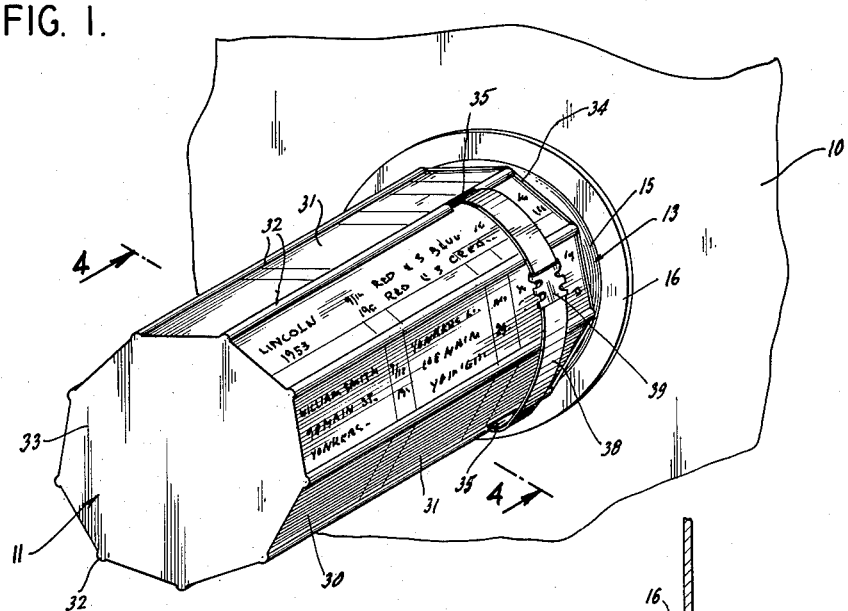
FIG. 2.
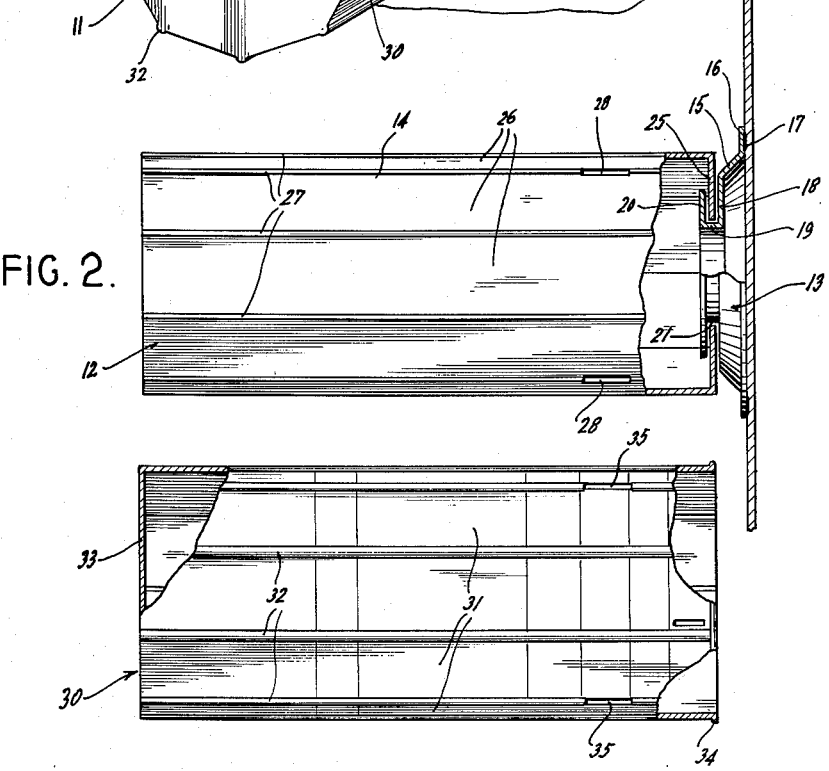
FIG. 3.
INVENTOR.
HERBERT B. STERNBERG
BY Mock & Blum
ATTORNEYS March 7, 1961  H. B. STERNBERG  2,973,596
VEHICLE IDENTIFICATION SYSTEM
Filed July 17, 1958  2 Sheets-Sheet 2
FIG. 4.
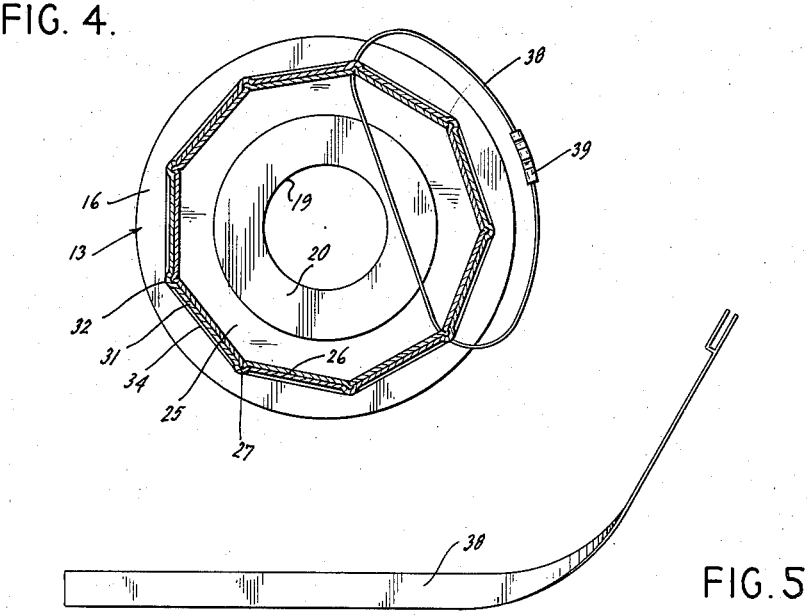
FIG. 5
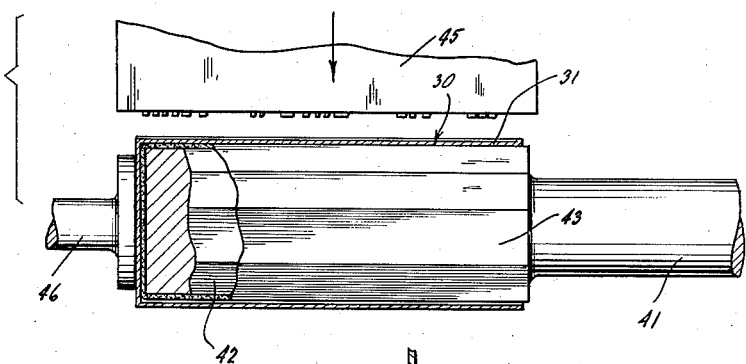
FIG. 6.
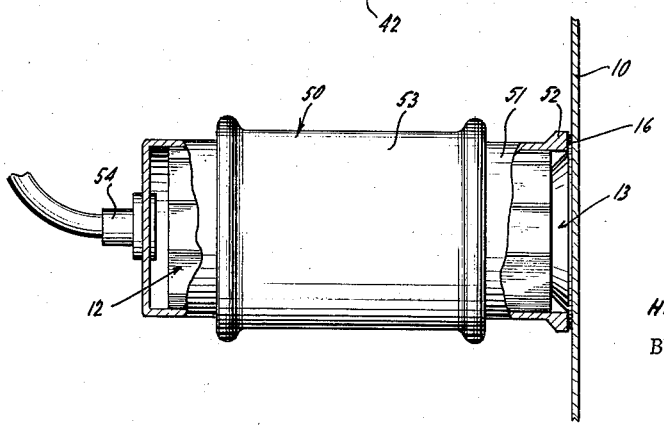
FIG. 7.
INVENTOR.
HERBERT B. STERNBERG
BY Mock & Blum
ATTORNEYS

United States Patent Office 2,973,596
Patented Mar. 7, 1961

2,973,596

VEHICLE IDENTIFICATION SYSTEM

Herbert B. Sternberg, Brooklyn, N.Y., assignor to Auto Facto Systems, Inc., White Plains, N.Y., a corporation of New York Filed July 17, 1958, Ser. No. 749,157

6 Claims. (Cl. 40—2.2)

This invention relates to a novel system for permanently recording the history of a vehicle, and is especially concerned with apparatus providing a permanent record of information identifying the vehicle.

As is well known, ownership to a motor vehicle is commonly passed or transferred several times during the life of the vehicle. This presents serious problems, especially in accurately appraising the value of a used vehicle, as by a purchaser, or for purposes of insurance and financing. Problems also exist in the proper identification of a vehicle, as by law enforcement agencies in recovering stolen property.

In order to overcome these difficulties, it is highly desirable to provide a permanent history of the vehicle, which may be relied upon for its authenticity and accuracy, both for purposes of identification and appraisal.

Accordingly, it is one object of the present invention to provide apparatus adapted to be permanently fixed to a vehicle which is capable of displaying all pertinent facts and information relative to the history of the vehicle, and wherein any tampering with such apparatus or attempted alteration of the information carried thereby is readily discernible.

It is another object of the present invention to provide apparatus of the type described which is extremely simple in construction and durable and reliable in use throughout the vehicle life, capable of being readily incorporated in the vehicle itself and easily provided with the necessary indicia.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Fig. 1 is a perspective view illustrating a recording device of the present invention as assembled and installed in a vehicle;

Fig. 2 is a side elevational view partly in section showing a mounting bracket of the assembly of Fig. 1;

Fig. 3 is a side elevational view, partly broken away, showing a cover element of the assembly of Fig. 1;

Fig. 4 is a transverse sectional view taken substantially along the line 4—4 of Fig. 1;

Fig. 5 is a perspective view illustrating a seal adapted to be employed in the assembly of Figs. 1 and 4;

Fig. 6 is an elevational view, partly in section, illustrating apparatus for providing the essential information on the cover element of Fig. 3; and Fig. 7 is an elevational view partly in section illustrating apparatus for affixing the bracket of Fig. 2 to a vehicle.

Referring now more particularly to the drawings, and specifically to Figs. 1–4 thereof, 10 designates a structural part of a vehicle, to which is affixed the identifying apparatus 11 of the present invention. The apparatus 11 includes a bracket generally designated 12, best seen in Fig. 2. The bracket includes a mount 13 and an extension element or carrier 14.

The mount 13 may be formed integrally or otherwise, and includes a generally frustum-conical portion 15 having its larger end provided with an outstanding peripheral flange 16 fixedly secured in facing engagement with the wall 10, as by a weld 17 or other suitable permanent securing means. On the inner end of the conical mount portion 15 is provided a radially inwardly extending annular wall 18. From the radially inner edge of the wall 18 extends a generally cylindrical wall 19 outward away from the vehicle part 10. An annular radially outstanding wall 20 is provided on the outer end of the cylindrical wall 19, so that the walls 18, 19 and 20 combine to define an annular, radially outwardly opening groove or trough 21.

The bracket element or extension 14 is of generally prismatic configuration, having an external cross section of polygonal shape provided with an odd number of sides, nine being shown for purposes of illustration in the drawings. The prismatic bracket element 14 may be hollow, extending outward from and in substantially axial alignment with the generally conical mount 13. Further, the prismatic bracket element 14 may be provided on its inner end with an internal flange or end wall 25 of generally annular configuration and extending into and rotatably received within the aforedescribed groove 21. In this manner, the bracket element or extension 14 is permanently and rotatably secured to the bracket element or mount 13.

By reason of the aforedescribed polygonal cross-sectional configuration of the bracket element 14, there are defined on the outer surface thereof a plurality of generally rectangular longitudinally extending faces or panels 26, which faces intersect with each other along parallel longitudinally extending lines of intersection. As best seen in Fig. 4, the lines of intersection of the adjacent faces 26 are externally raised to define on the exterior of the bracket element a plurality of parallel, longitudinally extending ridges 27. The bracket element 14 is preferably provided with at least two through openings or slots 28, preferably elongate in the longitudinal direction of the extension, and formed in spaced ridges 27 in substantially laterally aligned relation with respect to each other.

The cover of Fig. 3 is generally designated 30, and is of hollow prismatic configuration, having a polygonal cross-sectional configuration similar to and just slightly larger than that of the bracket element 14 for snug conforming engagement about the latter. The prismatic cover element 30 may be considered as formed of a plurality of longitudinally extending, generally rectangular, angularly disposed panels or faces 31, each adjacent pair of which is joined together by a longitudinally extending externally raised portion, rib or ridge 32. The inner or undersides of the ribs 32 are recessed to snugly and conformably receive the ridges or ribs 27 of the extension 14. The outer end of the cover 30 may be closed by an end wall 33, while the inner end of the cover is open to receive therethrough the bracket element 14. An external, peripherally extending rib 34 may be provided on the inner cover end. Formed in the cover 30 are a pair of circumferentially spaced, longitudinally extending through openings or slots 35 adapted to register, respectively, with the slots or openings 28 of the extension element. The slots or openings 35 are preferably formed in a pair of spaced ridges or ribs 32, extending longitudinally thereof. The cover 30 is advantageously fabricated of material capable of being embossed or otherwise marked, such that attempted alteration or defacement of the markings would be readily apparent.

In Figs. 1 and 4, the cover 30 is illustrated as snugly and conformably engaged about the bracket extension 14. The holes or slots 28 and 35 of the extension 14 and cover 30, respectively, are in registry in the assembled condition; and, a seal 38 of flexible strip material extends through the registering slots interiorly of the assembly, having its ends joined together exteriorly of the assembly by an appropriate non-openable securing element 39. That is, the securing element 39 may be of any conventional type adapted to be opened only by destruction thereof.

In the assembled condition, it will be understood that the cover 30 is freely rotatable with the bracket extension 14 to present any desired face of the cover to view. Further, relative rotation of the cover 30 and bracket element 14 is effectively prevented, both by the polygonal engagement of the elements, and especially by the interfitting ribs thereof. This restraint against relative rotation of the cover and bracket element prevents the seal 38 from being subjected to shear across its smallest dimension; and, attempted removal of the cover 30 by longitudinal sliding thereof is effectively resisted by the seal across its width or greatest dimension.

In Fig. 6 is shown a backing member or mandrel 41 having a solid head 42 preferably provided with a slightly yieldable covering 43, as of rubber or the like. The head and covering 42, 43 are fixedly positioned by means of the axial shank extending from the right-hand end, and are of an external prismatic configuration similar to that of the bracket extension 14 for snug conforming engagement in the cover 30. The cover 30 is illustrated in Fig. 6 as engaged over the head of the backing member 41. An embossing or printing member 45 is movable into and out of imprinting relation with respect to a selected face or panel 31 of the cover 30; and, a reinforcing member 46 is removably engageable with the end wall 33 of the cover to more rigidly support the cover and backing member under the force of the embossing member. The backing member may be rotatable to index the desired cover panel into facing relation with respect to the embossing member 45.

By this embossing apparatus, it will be apparent that the odd number of sides of the prismatic cover configuration provides no obstacle or deterrent to the imprinting or embossing procedure. However, in the absence of such a backing member, the odd-numbered sides of the prismatic configuration effectively prevents the cover from being backed up sufficiently to effectively emboss a panel thereof. Hence, the odd-sided prismatic configuration serves to effectively deter unauthorized imprinting of the cover.

In Fig. 7 is illustrated a welding element, generally designated 50, adapted to secure the bracket 12 to the vehicle part 10, in the condition illustrated in Fig. 2. More specifically, the bracket 12 is positioned with its flange 16 in facing engagement with the vehicle part 10; and, the welding element includes a sleeve 51 engageable over the bracket element 14 and having one end portion 52 abuttingly engageable with the outer face of flange 16. Heat may be applied to the sleeve 51 by a suitable heating element 53 electrically operated by conductor means 54. In this condition, with appropriate welding flux at the adjacent surfaces of the flange 16 and vehicle part 10, permanent welding of such surfaces is effectively accomplished. The sleeve 50 may then be removed, and the bracket 12 remains secured in the condition of Fig. 2.

From the foregoing, it is seen that the present invention provides a vehicle history recording system and apparatus which fully accomplishes its intended objects and is well adapted to meet practical conditions of manufacture, installation and use.

Although the present invention has been described in some detail by way of illustration and example for purposes of clarity of understanding, it is understood that certain changes and modifications may be made within the spirit of the invention and scope of the appended claims.

What is claimed is:

1. In a vehicle recording system, the combination comprising, a bracket adapted to be fixed to and project from a part of a vehicle, and a cover removably engaged over said bracket and fabricated of embossable material to be imprinted with vehicle identifying indicia, said bracket and cover being formed with registrable openings for receiving a seal to deter tampering with said system, said bracket and cover being of similar equilateral polygonal cross sectional configuration of an odd number of sides and the cover conformably receiving the bracket to prevent relative movement therebetween, the several faces of the cover providing areas for said imprinting, and the odd number of sides effectively deterring unauthorized imprinting of the cover faces.

2. A system according to claim 1, wherein the corners of said bracket and cover are provided with ridges for snug interfitting engagement with each other upon engagement of said cover over said bracket, to resist relative rotation of said bracket and cover and prevent shearing of a seal in said openings.

3. A system according to claim 1, said bracket comprising a mount adapted to be fixed to the vehicle part, and prismatic element having one end rotatably secured to said mount and having its other end remote from said mount.

4. A vehicle recording apparatus comprising a mount adapted to be fixed to a part of a vehicle, a generally prismatic bracket element having one end permanently secured to said mount and having its other end remote from said mount, a generally prismatic cover element removably conformably engaged over said bracket element and fabricated of embossable material to be imprinted on its faces with vehicle identifying indicia, said bracket and cover elements being formed with registrable openings, and a seal extending removably through said openings.

5. Apparatus according to claim 4, said openings being elongate longitudinally of said bracket and cover elements, said seal defining a strip extending conformably through said openings.

6. Apparatus according to claim 4, said bracket element being permanently secured to said mount and axially rotatable relative to the latter, to rotatably carry said cover.

References Cited in the file of this patent
UNITED STATES PATENTS

| | | |
|---|---|---|
| 1,194,065 | Probert | Aug. 8, 1916 |
| 1,504,613 | Ferguson | Aug. 12, 1924 |
| 1,885,692 | Dugan | Nov. 1, 1932 |